Figure 1:
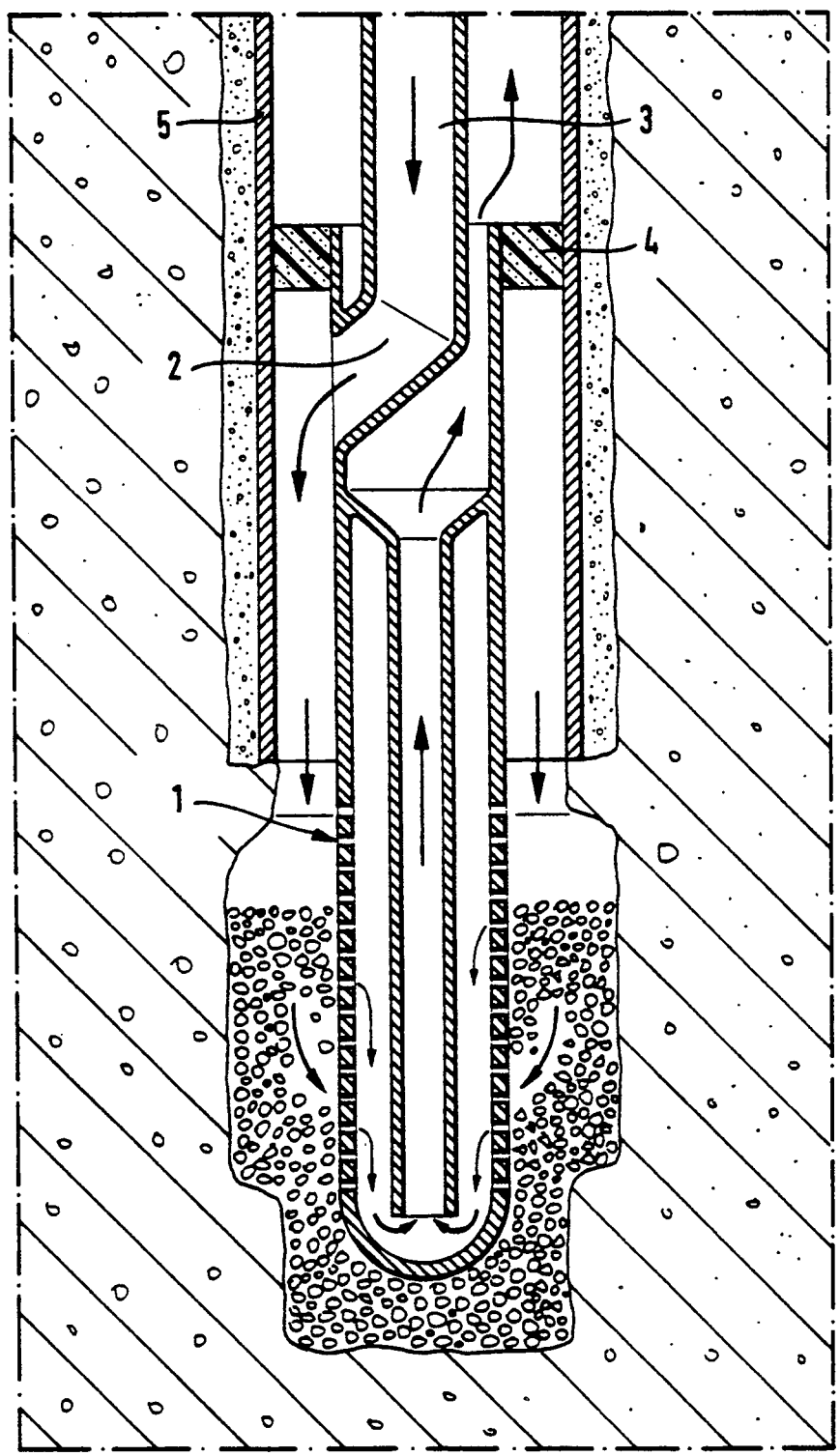

United States Patent [19]
Pusch et al.

[11] Patent Number: 5,346,013
[45] Date of Patent: Sep. 13, 1994

[54] METHOD FOR REDUCING OR COMPLETELY STOPPING THE INFLUX OF WATER IN BOREHOLES FOR THE EXTRACTION OF OIL AND/OR HYDROCARBON GAS

[75] Inventors: Günter Pusch, Celle; Mohammad Ranjbar, Clausthal-Zellerfeld, both of Fed. Rep. of Germany

[73] Assignee: Hoechst AG, Frankfurt, Fed. Rep. of Germany

[21] Appl. No.: 45,938

[22] Filed: Apr. 12, 1993

[30] Foreign Application Priority Data

Apr. 10, 1992 [DE] Fed. Rep. of Germany ....... 4212211

[51] Int. Cl.$^5$ .................... E21B 33/138; E21B 43/25; E21B 43/32
[52] U.S. Cl. .................................... 166/295; 166/294
[58] Field of Search ............... 166/295, 294, 274, 275, 166/305.1, 300

[56] References Cited

U.S. PATENT DOCUMENTS

| | | | |
|---|---|---|---|
| 2,204,223 | 6/1940 | Lawton et al. | 166/292 |
| 2,842,206 | 7/1958 | Bearden et al. | 166/295 |
| 2,867,278 | 1/1959 | Mallory et al. | 166/295 |
| 2,896,717 | 7/1959 | Howard | 166/295 X |
| 3,078,920 | 2/1963 | Brink et al. | 166/295 |
| 3,251,414 | 5/1966 | Willman | 166/295 |
| 3,297,088 | 1/1967 | Huitt et al. | 166/281 |
| 3,302,717 | 2/1967 | West et al. | 166/295 X |
| 3,593,794 | 7/1971 | Fischer et al. | 166/295 X |
| 3,630,280 | 12/1971 | Fischer et al. | 166/295 X |
| 4,182,417 | 1/1980 | McDonald et al. | 166/295 |

*Primary Examiner*—Stephen J. Novosad
*Attorney, Agent, or Firm*—Connolly and Hutz

[57] ABSTRACT

The present invention relates to a method for reducing or completely stopping the influxes of water of a deposit in at least a portion of a borehole for the extraction of oil and/or hydrocarbon gas, which traverses a deposit, a solution of a polymer being introduced, starting from the borehole, into that portion of the deposit in which the influxes of water are to be reduced or stopped, and the bore subsequently being put into service for the extraction of oil and/or hydrocarbon gas, the fluids present in the deposit coming into contact with said portion of the deposit containing the polymer and the oil and/or hydrocarbon gas flowing through said portion of the deposit and reaching the borehole, wherein the non-aqueous solution of a hydrophobic, water-insoluble polymer is introduced into the deposit and the polymer precipitates in the presence of the connate water of the deposit.

20 Claims, 2 Drawing Sheets

METHOD FOR REDUCING OR COMPLETELY STOPPING THE INFLUX OF WATER IN BOREHOLES FOR THE EXTRACTION OF OIL AND/OR HYDROCARBON GAS

DESCRIPTION

Water often exists as a saline solution in the same formation as oil or gas. The extraction of oil or of hydrocarbon gas is thus accompanied by the extraction of water in such an amount as to give rise to considerable problems. Directly or indirectly it causes the precipitation of salts in the vicinity of the borehole or in the borehole itself. It considerably increases the corrosion of all metal parts underground or above ground, and increases, without any benefit, the quantities of the liquids pumped, transferred and stored. Furthermore, it produces emulsions with the oil which are difficult to break above ground and which, below ground, form blockages in the cavities of the formation.

According to the prior art, numerous methods have been proposed and practiced whose purpose is to reduce the water inflows into the boreholes for the extraction of oil or hydrocarbon gas. The methods frequently consist in the introduction of an impregnable barrier in the formation between the water and borehole or between the water and the oil or hydrocarbon gas. The agents commonly introduced block almost as much oil or hydrocarbon gas as water. The components of this barrier may be: cement, resins, suspensions of solid particles, paraffins or water-soluble polymers which are crosslinked in the deposit by means of the introduction of so-called crosslinkers.

In addition to these methods of total blockage of the influx of water, methods of partial blockage are also known. At present water-soluble polymers are used, the polymers introduced as a solution into the porous medium, such as gravel, sandstone, limestone or solid rock, being adsorbed on the surface of the porous medium and projecting so far into the pores that they reduce the water influxes by friction. The use of water-soluble polymers is disclosed by U.S. Pat. No. 4 095 651, U.S. Pat. No. 4 718 491 and U.S. Pat. No. 4 842 071. The use of such water-soluble polymers has the drawback that the polymers may be desorbed and dissolved by the deposit water arising during the production.

The object of the invention is to provide a method for reducing or completely stopping the influx of water into production boreholes without reducing the extraction of oil or hydrocarbon gas. Surprisingly it has been found that hydrophobic, water-insoluble polymers such as polystyrene, copolymers of polystyrene, poly(meth-)acrylic acid esters, the copolymers thereof and ethylene/vinyl acetate copolymers dissolved in organic solvents can be readily introduced into the formation in which the water is to be sealed off, are precipitated in the presence of the connate water present there and provide effective sealing off of water.

The method according to the invention must not be confused with the method for the tertiary extraction of oil, according to which a polymer solution which in general has a weak concentration (a few 100 ppm) is introduced via one or more injection boreholes, specifically under a sufficient pressure for the solution to penetrate into the formation and to replace part of the oil of said formation which is then extracted by means of another series of production boreholes. The amounts introduced are of the order of magnitude of the volume of the formation. It is well known that polymer-containing water is much more effective for this method of extraction, because it is more viscous than the deposit water.

The method according to the invention must furthermore not be confused with the method which consists in adding a polymer to drilling fluids. The purpose of these fluids is to lubricate the drilling tool, to enable the discharge of the rock fragments, to exert a backpressure which is noticeably equal to the underground pressure, and to produce a suspension on the walls of the borehole. They circulate in a closed circulation between the bottom and the surface where they are filtered and their composition is readjusted. The amounts used are small, specifically of the order of magnitude of the borehole volume.

The method according to the invention, whose objective is to reduce the water inflows into a borehole in the course of production, consists in introducing into the deposit—starting from said borehole—an amount of a polymer solution.

The invention relates to a method for reducing or completely stopping the water inflows from a deposit in at least a portion of a borehole for the extraction of oil and/or hydrocarbon gas, which borehole traverses a deposit, a solution of a polymer being introduced, starting from the borehole, into that portion of the deposit in which the water inflows are to be reduced or stopped, and the bore subsequently being put into service for the extraction of oil and/or hydrocarbon gas, the fluids present in the deposit coming into contact with said portion of the deposit containing the polymer and the oil and/or hydrocarbon gas flowing through said portion of the deposit and reaching the borehole, wherein the non-aqueous solution of a hydrophobic, water-insoluble polymer is introduced into the deposit and the polymer precipitates in the presence of the connate water of the deposit.

The polymers used according to the invention are water-insoluble, soluble in organic solvents and have a hydrophobic character. Suitable homo- and copolymers are listed below which can be used in the method according to the invention.

Polystyrenes containing structural units of the formula I

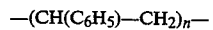

—(CH(C$_6$H$_5$)—CH$_2$)$_n$— where n is a number between 90 and 9,000 and optionally further comonomers such as acrylonitrile, α-methylstyrene and maleic anhydride.

The molecular weight of the polystyrenes is in the range between 1,000 and $10^6$ preferably between 10,000 and 500,000.

Poly(meth)acrylic acid C$_{14}$–C$_{22}$-alkyl esters (A),
Copolymers (B) comprising
  from 50 to 99.9% by weight of a (meth)acrylic acid C$_{14}$–C$_{22}$-alkyl ester and
  from 50 to 0.1% by weight of a comonomer of the formula II

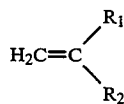

in which $R^1$ is hydrogen or methyl,
$R^2$ is a group of the formulae

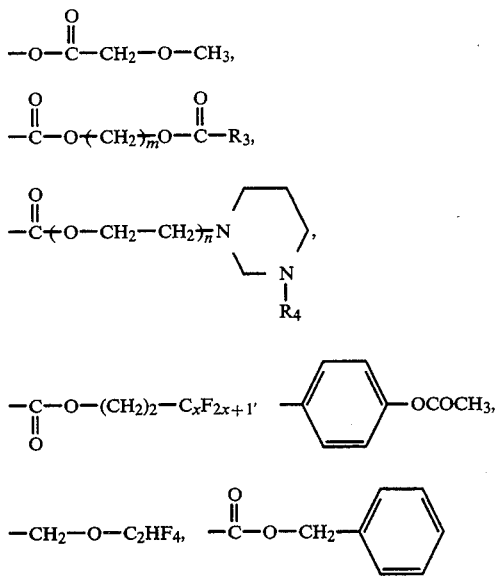

or

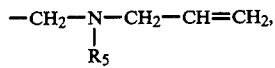

$R^3$ is $C_1$–$C_{80}$-alkyl, $C_2$–$C_{80}$-alkenyl, $C_5$- or $C_6$-cycloalkyl or cycloalkenyl which may be substituted by alkyl groups, aralkyl, alkaryl or the radical of a dimer fatty acid, of maleic acid, of succinic acid or of a $C_6$–$C_{22}$-alkenylsuccinic acid, $R_4$ is $C_1$–$C_{80}$-alkyl, $C_2$–$C_{80}$-alkenyl, $C_5$- or $C_6$-cycloalkyl or cycloalkenyl which may be substituted by alkyl groups, aryl, aralkyl or alkaryl, $R_5$ is $C_6$–$C_{20}$-alkyl, m is 2 or 3 n is a number from 1 to 30 and x is a number from 2 to 20.

Those comonomers are preferred in which $R_3$ and $R_4$ are $C_{6-38}$-alkyl, $C_6$–$C_{38}$-alkenyl, cyclohexyl, cyclohexenyl, naphthenyl, phenyl, benzyl, $C_1$–$C_4$-mono-, di-or trialkylphenyl or alternatively $R_3$ is the radical of a dimer fatty acid, of maleic acid, of succinic acid or of a $C_6$–$C_{18}$ alkenylsuccinic acid and x represents numbers from 4 to 16.

Polymer mixtures comprising
from 10 to 90% by weight, preferably from 60 to 80% by weight of poly(meth)acrylic acid-$C_{14}$–$C_{22}$-alkyl esters (A), and
from 90 to 10% by weight, preferably from 40 to 20% by weight of at least one copolymer (B).

Ethylene/vinyl acetate copolymers having a molecular weight of from 700 to 600,000, preferably from 3,000 to 60,000, the mixed polymer containing from 99 to 40% by weight of ethylene units and the weight ratio of the two copolymers being in the range from 20:1 to 1:20.

Terpolymers containing, in addition to ethylene, from 0.5 to 20% by weight of diisobutylene and from 20 to 25% by weight of vinyl acetate (each based on the terpolymer). The molecular weight of the terpolymers is in the range from 1,000 to 100,000, preferably from 10,000 to 30,000.

Copolymers from ethylene and an ester of vinyl alcohol or of acrylic acid or of methacrylic acid as a comonomer which, per 100 parts by weight of ethylene, contain from 25 to 55 parts by weight of the comonomer.

The esters of the vinyl alcohol contain from 4 to 12 carbon atoms and are derivatives of saturated aliphatic monocarboxylic acids which may be straight-chain or branched. Esters having, for example, from 4 to 8 carbon atoms have proved useful. Vinyl acetate and vinyl propionate are particularly suitable. Acrylic acid or methacrylic acid esters are to be understood as compounds which are derived from straight-chain or branched, saturated aliphatic alcohols having from 2 to 20 carbon atoms. The alcohol radical preferably has from 2 to 8 carbon atoms. Particularly suitable are n-butyl acrylate, tert-butyl acrylate, n-butyl methacrylate and tert-butyl methacrylate.

The hydrophobic, water-insoluble homo- and copolymers used according to the invention, and methods for their preparation, are disclosed by Ullmann, 4th edition, volume 19, pp. 266–293, EP-A-376 138, DE-C-20 37 673, EP-A-203 554 and DE-A-36 40 613.

Suitable organic solvents are those which are at least partially soluble in water or at least in a mixture with other organic solvents are partially soluble in water and which dissolve the copolymer to be used in a sufficient amount. Examples include ketones such as acetone or diacetone alcohol and mono- or polynuclear, optionally substituted aromatic hydrocarbons such as toluene or xylene and the mixtures thereof.

The concentration of the polymer solution used can be chosen within a wide range and is preferably from 0.01 to 20 or preferably from 0.1 to 10% by weight. The amount of copolymer introduced into the production zone around the borehole depends on local conditions. In most cases it is from 5 to 500 kg and preferably from 20 to 100 kg per vertical meter of the treated zone.

The introduction of the polymer solution is achieved by known measures according to the prior art. In general terms, a pressure is exerted on the polymer solution which is greater than the pressure exerted by the fluids at depth, i.e. the liquids and gases present there (deposit pressure). Under these conditions the polymer solution penetrates remarkable distances into the deposit, at least 5 m, related to the borehole. It was found to be advantageous to introduce the polymer solution into a gravel bed filter which is illuviated into the annular space between the borehole wall and the filter. The establishment of a gravel bed filter is disclosed, for example, by Patton, L. Douglas and Abbott, W. A.: "Well completions and workovers—Part 19 (The Systems Approach to Sand Control)" Pet. Eng. Intl. (November 1981) 156–176. Because of its preferred use, the method will be briefly described by way of introduction.

FIG. 1 shows a longitudinal section through a gravel bed filter.

By using a so-called reamer, the diameter of the borehole is enlarged. Conventionally, the reamers used are bits hinged outwards on the drill head. In this increased borehole, a liner 1 is suspended which in its upper part comprises a well-fluid stream diversion member 2, also called "cross-over tool". At approximately the same height as 2, a borehole sealing packer 4 fixed to the tubing 3 is placed. The well-fluid stream comprising well fluid and gravel is passed into the filter space via the annular space between tubing and shield tube, and the gravel is poured onto the floor. The well fluid passes into the tubing through the slits of the liner (slit width smaller than the grain diameter of the gravel), and is conducted above ground (indirect circulation). The well-fluid stream pressure and gravity give rise to layered build-up of the gravel bed up to the well-fluid stream diversion member 2. When the gravel bed has reached its full height, the circulation pressure increases. By means of this pressure increase, the filling level of the gravel bed can be checked. The well-fluid stream diversion member 2 is closed, the pipe connection above the packer is detached and the tubing assembly is removed. An injection tube reaching down to the floor is then fitted, which is used to introduce the polymer solution.

The procedure of introducing the polymer solution usually comprises several individual steps which are explained below.

Depending on the polymer used, saline water is first introduced into the deposit. Said saline water advantageously has a composition different from that of the deposit water present. By introducing the saline water, the deposit water present in the region to be treated is exchanged. Depending on the polymer solution employed subsequently, there are beneficial effects with regard to the precipitation of the dissolved polymer.

The saline water may contain one or more salts of alkali metals or alkaline earth metals, especially NaCl, KCl, $MgCl_2$, $MgSO_4CaCl_2$, $Na_2SO_4$, $K_2SO_4$ and/or $NaNO_3$, and generally of chlorides, sulfates or nitrates of metals such as, for example, sodium, potassium, calcium or magnesium. Those solutions are preferred which, at least for the greater part, contain sodium chloride. The salts of the alkaline earth metals are less desirable, especially in larger amounts, because they may produce unwanted precipitates, for example if the environment contains carbonates or has a pH which is equal to or greater than 9.

The salt concentration can be selected within a wide range. It depends on the nature and the concentration of the salt in the water of the deposit so that it is not possible to give a general range of the useable values. The best salt concentration can be determined by a simple prior experiment. A generally valid rule states that the salts of the alkali metals must be used in a stronger concentration than the salts of the alkaline earth metals. Relatively high concentrations in general are especially advantageous, for example in the case of sodium chloride at least 20 g and preferably at least 75 g of salt/l or water, especially from 100 to 200 g/l. Calcium chloride is generally used with a concentration of at least 0.5 g/l, preferably from 10 to 20 g/l.

Next, a so-called displacement agent, such as diesel oil, is introduced into the filter bed and the subsequent deposit which displaces the pore water present in this deposit region. In the ideal case, so much pore water is displaced that only the so-called connate water remains, the term connate water referring to the water which wets the surface of the formation. It has been found that, when highly viscous displacement agents such as oil raffinates are introduced, only small amounts of connate water remain and this results in delayed precipitation of the polymer solution introduced subsequently. On the other hand, if low-viscosity displacement agents such as diesel oil are used, less pore water is displaced and a more rapid precipitation of the polymer solution is thus achieved.

By means of the measures described: introduction of saline water and/or introduction of displacement agent of various viscosities, an accelerated or delayed precipitation of the hydrophobic, water-insoluble polymer is achieved. This is called "time-controlled precipitation" of the polymer.

In the next step, the polymer solution is introduced. The composition, the concentration and the amount of polymer solution have already been described earlier. In very general terms, the polymer solution is a fluid, hydrophobic substance which precipitates under the influence of the connate water. The polymer solution displaces the pore charge, in this case the organic displacement agent, and lines the surface of the rock, such as gravel or solid rock, with a thin film. As a result of the lining of the pore space with a hydrophobic, water-insoluble polymer, the water influx is reduced or even stopped completely without preventing the passage of oil and/or hydrocarbon gas into the borehole.

The excess polymer solution is removed from the pore space by introducing a further displacement agent such as diesel oil or hydrocarbon gas and, as a result of this displacement, reaches locations of the deposit where no polymer solution is yet present and where a reaction with the connate water present there is still possible. In this way, a seal is achieved which penetrates into the deposit, while being beneficial, this seal is not absolutely necessary.

The measures listed above are preferably carried out in such a way that the next measure does not start until the previous measure has been effected. On the other hand, it is quite possible for two or even more measures to be carried out simultaneously if this has the desired effect on the time-controlled precipitation of the polymer.

Following the injection of the polymer solution, the production pipe string is fitted, reduced pressure in the borehole is effected, and recovery commences. In so doing, it has been found that the fluids present in the deposit, comprising deposit water, displacement agent, unreacted polymer solution, oil and hydrocarbon gas come into contact with the portion of the deposit containing the polymer, the oil and the hydrocarbon gas flowing selectively through this portion of the deposit.

The polymer solutions are preferably used for reducing or completely stopping the influx of water in the case of boreholes in sandstone, carbonate rock or silicate rock.

The following study documents the effect of the hydrophobic, water-insoluble polymers on the flow resistance of salt water and gas in a porous medium.

| 1. | Materials used | |
|---|---|---|
| | A: Polymer solution: | polystyrene in acetone concentration: 200 mg/l |
| | B: Model water: | salinity: 100 g/l pH = 6.5 composition: (% by weight) NaCl 62.0 $MgCl_2$ 5.4 $NaHCO_3$ 17.5 $CaCl_2$ 5.2 $Na_2SO_4$ 9.9 |
| | C: Vosges sandstone: | d = 30 mm, l = 200 mm permeability: 0.04–0.06 $\mu m^2$ porosity: 19–20% |

2. Experimental procedure 2.1 Mounting the sandstone core in a Hassler cell 2.2 Determination of $\Delta P_{1(gas)}$ over the core at a gas injection rate of 100 cm$^3$/min ($\Delta P_{1(gas)}$: pressure difference between core input and core output prior to the addition of the polymer solution)

3. Determination of the gas permeability according to the Darcy method (G. Pusch: Stationäre instationäre Gaspermeasbilitätsmessung and niedrig permeablen Gesteinen [Steady/unsteady gas permeability measurement on low-permeability rocks], Erdöl-Erdgas-Kohle, 102 (1986), 5, pp. 235–239)

4. Evacuation of the core at a pressure of 1 mbar, followed by saturation with model water at a flow rate of 10 cm$^3$/h 5. Determination of $\Delta P_{1(water)}$ over the core at a model-water injection rate of 10 cm$^3$/h 6. Determination of the water permeability according to the Darcy method 7. Establishing the connate water saturation by displacing the pore water by gas (nitrogen) at a flow rate of 100 cm$^3$/h in a vertical flow direction 8. Injection of the polymer solution in an amount corresponding to half the pore volume, injection rate 10 cm$^3$/h; subsequent wait time: 2 h 9. Displacement of the excess polymer solution using gas, and flow of gas through the polymer-containing pore space with determination of $\Delta P_{2(gas)}$ at a gas injection rate of 100 cm$^3$/min over a period of 45 days. ($\Delta P_2$: pressure difference between core input and core output after addition of the polymer solution) Determination of the residual flow resistance for gas (RRF) according to the following equation $$RRF_{gas} = \Delta P_{2(gas)}/\Delta P_{1(gas)}$$

at a constant flow rate of 100 cm$^3$/min.

10. Saturation of the rock core with model water at a flow rate of 10 cm$^3$/h

11. Determination of $\Delta P_{2(water)}$ at a model water injection rate of 10 ml/h over a period of 45 days. Determination of the residual flow resistance for water:

$$RRf_{water} = \Delta P_{2(water)}/\Delta P_{1(water)}$$

at an injection rate of 10 cm$^3$/h.

Figure 2:
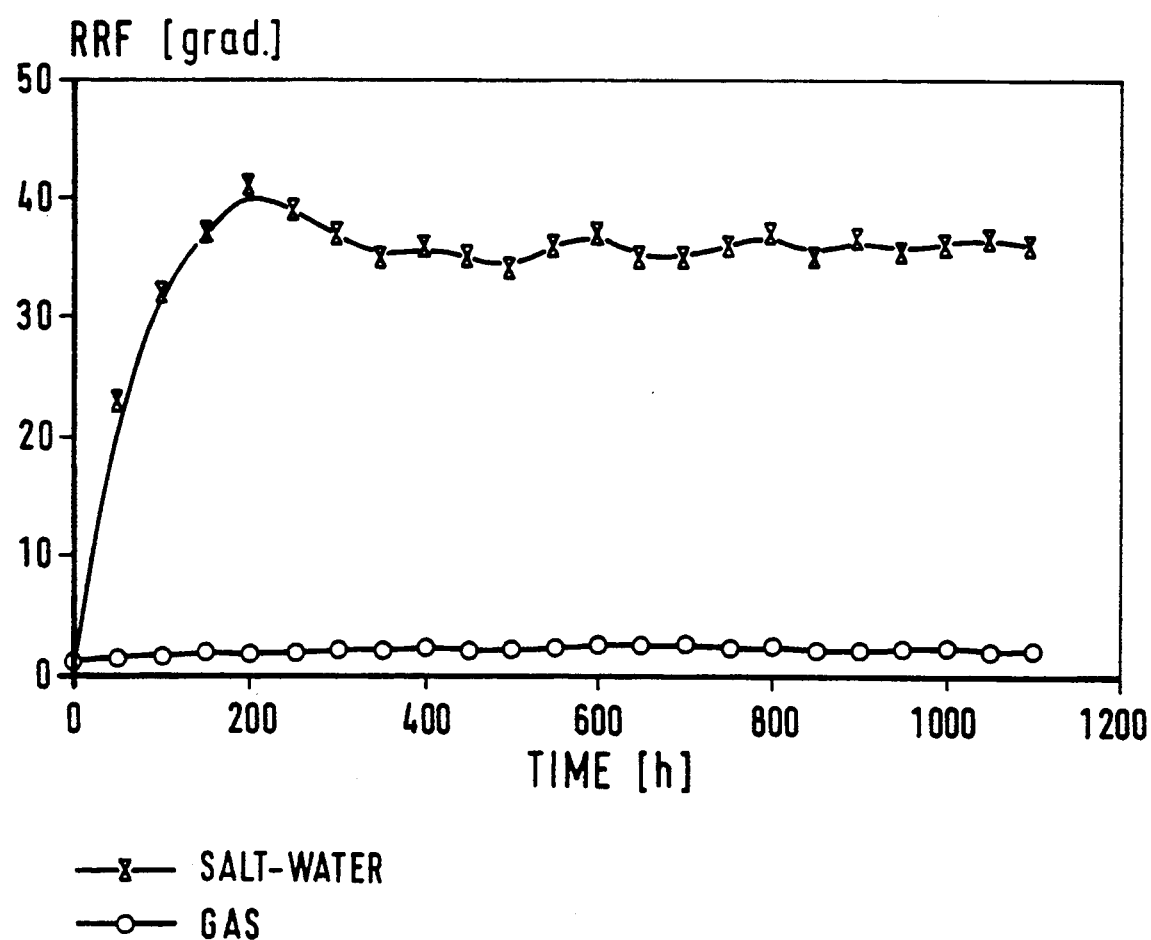

The results of this typical experiment are shown in FIG. 2. The flow resistance for gas (RRF$_{gas}$) is increased only slightly compared to value 1 and remains approximately unchanged over a prolonged period, while the residual flow resistance for salt water (RRF$_{water}$) increases to 40 times the value.

We claim:

1. A method for reducing or completely stopping the water inflows of a deposit in at least a portion of a borehole for the extraction of oil and/or hydrocarbon gas, which borehole traverses a deposit, a solution of a polymer being introduced, starting from the borehole, into that portion of the deposit in which the water inflows are to be reduced or stopped, and the bore subsequently being put into service for the extraction of oil and/or hydrocarbon gas, the fluids present in the deposit coming into contact with said portion of the deposit containing the polymer and the oil and/or hydrocarbon gas flowing through said portion of the deposit and reaching the borehole, wherein the non-aqueous solution of a hydrophobic, water-insoluble polymer is introduced into the deposit and the polymer precipitates in the presence of the connate water of the deposit.

2. The method as claimed in claim 1, wherein first saline water, then a displacement agent, then the solution of the polymer and subsequently a displacement agent are introduced into the deposit.

3. The method as claimed in claim 1, wherein the solution of the polymer is introduced into a bed of gravel.

4. The method as claimed in claim 1, wherein the hydrophobic, water-insoluble polymers used are polystyrene, poly(meth)acrylic acid esters, and the copolymers thereof and ethylene/vinyl acetate copolymers or mixtures of these compounds.

5. The method as claimed in claim 1, wherein the solution of the polymer has a concentration from 0.01 to 20% by weight.

6. The method as claimed in claim 1, wherein the solvents used are ketones, mono- or polynuclear aromatic hydrocarbons, or mixture thereof.

7. A process for reducing or completely stopping the water inflows of a deposit in at least a portion of a borehole for the extraction of oil and/or hydrocarbon gas comprising the use of hydrophobic, water-insoluble polymer, wherein highly viscous oil raffinates or diesel oil are used as displacement agent to adjust the connate water to a high or low value for controlling the precipitation of the hydrophobic, water-insoluble polymer.

8. The method as claimed in claim 1, wherein the hydrophobic, water-insoluble polymers are dissolved in solvents.

9. The process as claimed in claim 6, wherein the solvents used are selected from the group consisting of acetone, diacetone alcohol, toluene, xylene and mixtures thereof.

10. The method as claimed in claim 4, wherein said polystyrene is used and contains (a) structural units of the formula I

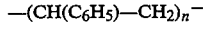

where n is a number between 90 and 9,000, (b) comonomers that are selected from the group acrylonitrile, α-methylstyrene and maleic anhydride or (c) a mixture of (a) and (b).

11. The method as claimed in claim 10, wherein the polystyrene has a molecular weight between 1,000 and $10^6$.

12. The method as claimed in claim 11, wherein the polystyrene has a molecular weight between 10,000 and 500,000.

13. The method as claimed in claim 1, wherein the hydrophobic, water-insoluble polymers used are copolymers comprising from 50 to 99.9% by weight of a (meth)acrylic acid $C_{14}$–$C_{22}$-alkyl ester and from 50 to 0.1% by weight of a comonomer of the formula II

in which
R$^1$ is hydrogen or methyl,
R$^2$ is a group of the formulae

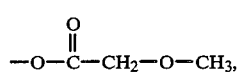

-continued

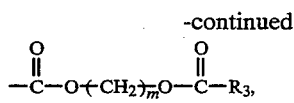

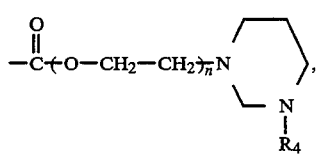

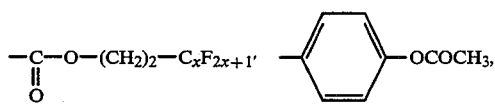

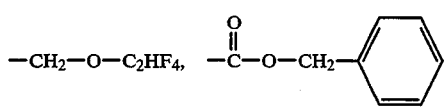

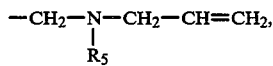

or

—CH$_2$—N(R$_5$)—CH$_2$—CH=CH$_2$,

R$_3$ is C$_1$–C$_{80}$-alkyl, C$_2$–C$_{80}$-alkenyl, C$_5$- or C$_6$- cycloalkyl or cycloalkenyl which may be substituted by alkyl groups, aralkyl, alkaryl or the radical of a dimer fatty acid, of maleic acid, of succinic acid or of a C$_6$–C$_{22}$-alkenyl-succinic acid, R$_4$ is C$_1$–C$_{80}$alkyl, C$_2$–C$_{80}$-alkenyl, C$_5$- or C$_6$-cycloalkyl or cycloalkenyl which may be substituted by alkyl group, aryl group, aralkyl groups or alkaryl groups, R$_5$ is C$_6$–C$_{20}$-alkyl, m is 2 or 3 n is a number from 1 to 30 and x is a number from 2 to 20.

14. The method as claimed in claim 13, wherein R$_3$ and R$_4$ are selected from the group consisting of C$_{6-38}$-alkyl, C$_6$–C$_{38}$-alkenyl, cyclohexyl, cyclohexenyl, naphthenyl, phenyl, benzyl, C$_1$–C$_4$-mono-, di- or trialkylphenyl or alternatively R$_3$ is the radical of a dimer fatty acid, of maleic acid, of succinic acid and of a C$_6$–C$_{18}$-alkenylsuccinic acid and x represents numbers from 4 to 16.

15. The method as claimed in claim 1, wherein the hydrophobic, water-insoluble polymers is selected from a mixture comprising from 10 to 90% by weight of poly(meth)acrylic acid-C$_{14}$–C$_{22}$-alkyl

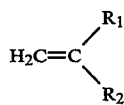 (II)

in which

R$^1$ is hydrogen or methyl,

R$^2$ is a group of the formulae

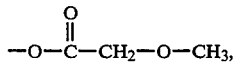

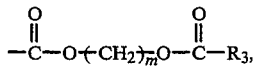

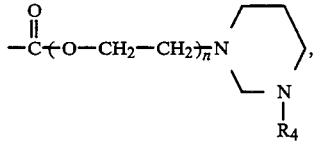

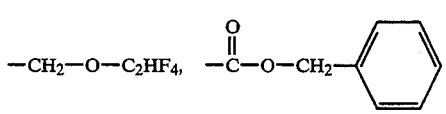

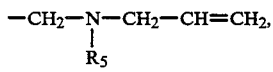

or

—CH$_2$—N(R$_5$)—CH$_2$—CH=CH$_2$,

R$_3$ is C$_1$–C$_{80}$-alkyl, C$_2$–C$_{80}$-alkenyl, C$_5$- or C$_6$-cycloalkyl or cycloalkenyl which may be substituted by alkyl groups, aralkyl, alkaryl or the radical of a dimer fatty acid, of maleic acid, of succinic acid or of a C$_6$–C$_{22}$-alkenyl-succinic acid, R$_4$ is C$_1$–C$_{80}$-alkyl, C$_2$–C$_{80}$-alkenyl, C$_5$- or C$_6$-cycloalkyl or cycloalkenyl which may be substituted by alkyl groups, aryl groups, aralkyl groups or alkaryl groups, R$_5$ is C$_6$–C$_{20}$-alkyl, m is 2 or 3 n is a number from 1 to 30 and x is a number from 2 to 20.

16. The method as claimed in claim 15, wherein the polymer mixture comprises from 60 to 80% by weight of poly(meth)acrylate acid-C$_{14}$–C$_{22}$-alkyl esters (A) and from 40 to 20% by weight of at least one copolymer (B).

17. The method as claimed in claim 1, wherein the hydrophobic, water-insoluble polymer is ethylene/vinylacetate copolymers having molecular weight of from 700 to 600,000, and said polymer containing from 99 to 40% by weight of ethylene units and the weight ratio of the two copolymers being in the range from 20:1 to 1:20.

18. The method as claimed in claim 17, wherein the ethylene/vinylacetate copolymers have a molecular weight from 3,000 to 60,000.

19. The method as claimed in claim 1, wherein the hydrophobic, water-insoluble polymers is terpolymers containing ethylene and from 0.5 to 20% by weight of diisobutylene and from 20 to 25% by weight of vinylacetate and said terpolymers have a molecular weight in the range from 1,000 to 100,000.

20. The method as claimed in claim 19, wherein said terpolymers have a molecular weight in the range from 10,000 to 30,000.

* * * * *